US011061492B2

(12) United States Patent
Yong et al.

(10) Patent No.: US 11,061,492 B2
(45) Date of Patent: Jul. 13, 2021

(54) GYRATORY SENSING SYSTEM TO ENHANCE WEARABLE DEVICE USER EXPERIENCE VIA HMI EXTENSION

(71) Applicant: Intel Corporation, Santa Clara, CA (US)

(72) Inventors: Khang Choong Yong, Puchong (MY); Wil Choon Song, Penang (MY); Howard L. Heck, Hillsboro, OR (US); Su Sin Florence Phun, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/834,865

(22) Filed: Mar. 30, 2020

(65) Prior Publication Data

US 2020/0225771 A1 Jul. 16, 2020

Related U.S. Application Data

(63) Continuation of application No. 16/545,453, filed on Aug. 20, 2019, which is a continuation of application
(Continued)

(51) Int. Cl.
*G09G 5/00* (2006.01)
*G06F 3/0362* (2013.01)
(Continued)

(52) U.S. Cl.
CPC ............ *G06F 3/0362* (2013.01); *G06F 1/163* (2013.01); *G06F 3/0338* (2013.01); *G06F 3/0346* (2013.01); *G06F 3/0354* (2013.01)

(58) Field of Classification Search
CPC ...... G06F 3/0362; G06F 3/0346; G06F 3/048; G06F 3/0482; G06F 3/04842
See application file for complete search history.

(56) References Cited

U.S. PATENT DOCUMENTS 5,659,521 A 8/1997 Amano
6,556,222 B1 4/2003 Narayanaswami
(Continued)

FOREIGN PATENT DOCUMENTS

CN 101431546 5/2009
CN 104247383 12/2014
(Continued)

OTHER PUBLICATIONS

National Intellectual Property Administration of China, "Office Action," mailed in connection with Chinese Patent Application No. 201680028425.0, dated Aug. 19, 2020, 8 pages.
(Continued)

*Primary Examiner* — Vijay Shankar
(74) *Attorney, Agent, or Firm* — Hanley, Flight & Zimmerman, LLC

(57) ABSTRACT

Methods and systems may provide for a gyratory sensing system (GSS) for extending the human machine interface (HMI) of an electronic device, particularly small form factor, wearable devices. The gyratory sensing system may include a gyratory sensor and a rotatable element to engage the gyratory sensor. The rotatable element may be sized and configured to be easily manipulated by hand to extend the HMI of the electronic device such that the functions of the HMI may be more accessible. The rotatable element may include one or more rotatable components, such as a body, edge or face of a smart watch, that each may be configured to perform a function upon rotation, such as resetting, selecting, and/or activating a menu item.

22 Claims, 7 Drawing Sheets

Related U.S. Application Data

No. 14/740,609, filed on Jun. 16, 2015, now Pat. No. 10,386,941.

(51) Int. Cl.
| | |
|---|---|
| *G06F 1/16* | (2006.01) |
| *G06F 3/0338* | (2013.01) |
| *G06F 3/0354* | (2013.01) |
| *G06F 3/0346* | (2013.01) |

(56) References Cited

U.S. PATENT DOCUMENTS

| | | | |
|---|---|---|---|
| 6,575,618 | B1 | 6/2003 | Inoue et al. |
| 7,506,269 | B2 | 3/2009 | Lang |
| 7,778,118 | B2 | 8/2010 | Lyons et al. |
| 9,261,920 | B2 | 2/2016 | Wang et al. |
| 9,785,123 | B2 * | 10/2017 | Mansour ............ G04G 21/08 |
| 10,042,551 | B2 | 8/2018 | Jang et al. |
| 10,521,009 | B2 * | 12/2019 | Iyer ............ G06F 3/017 |
| 2002/0101457 | A1 | 8/2002 | Lang |
| 2004/0021702 | A1 | 2/2004 | Lucaci et al. |
| 2006/0139320 | A1 | 6/2006 | Lang |
| 2009/0059730 | A1 | 3/2009 | Lyons et al. |
| 2011/0199305 | A1 | 8/2011 | Suh |
| 2013/0035139 | A1 | 2/2013 | Sheynblat et al. |
| 2014/0192626 | A1 | 7/2014 | Wolff et al. |
| 2014/0347289 | A1 | 11/2014 | Suh et al. |
| 2015/0160856 | A1 | 6/2015 | Jang et al. |
| 2015/0161885 | A1 | 6/2015 | Wang et al. |
| 2016/0091867 | A1 * | 3/2016 | Mansour ............ G04G 21/08 368/294 |

FOREIGN PATENT DOCUMENTS

| | | |
|---|---|---|
| CN | 104699267 | 6/2015 |
| JP | 2000267797 | 9/2000 |
| JP | 2005017012 | 1/2005 |
| JP | 2009518738 | 5/2009 |
| JP | 2010017386 | 1/2010 |
| JP | 2012508408 | 4/2012 |
| JP | 2014529122 | 10/2014 |
| KR | 10-2015-0057841 | 5/2015 |
| KR | 10-1520806 | 5/2015 |
| WO | 2014019085 | 2/2014 |
| WO | 2014189197 | 11/2014 |
| WO | 2015030294 | 3/2015 |

OTHER PUBLICATIONS

European Patent Office, "Extended European Search Report," mailed in connection with European Patent Application No. 16812108.5, dated Jan. 2, 2019, 7 pages.

GSMArena, "Samsung Patent for Ring-Operated Smartwatch Surfaces," GSMArena Blog, Nov. 28, 2014, 7 pages. Retrieved from http://blog.gsmarena.com/samsung-patent-ring-operated-smartwatch-surfaces/.

International Searching Authority, "International Search Report and Written Opinion," mailed in connection with International Patent Application No. PCT/US2016/032626, dated Aug. 23, 2016, 10 pages.

United States Patent and Trademark Office, "Notice of Allowance," mailed in connection with U.S. Appl. No. 14/740,609, dated Apr. 2, 2019, 8 pages.

United States Patent and Trademark Office, "Non-final Office Action," mailed in connection with U.S. Appl. No. 14/740,609, dated Oct. 10, 2018, 6 pages.

Japanese Patent Office, "Office Action," mailed in connection with Japanese Patent Application No. 2017-559835, dated Jul. 3, 2020, 8 pages.

Japanese Patent Office, "Office Action," mailed in connection with Japanese Patent Application No. 2017-559835, dated Nov. 20, 2020, 13 pages.

United States Patent and Trademark Office, "Notice of Allowance," mailed in connection with U.S. Appl. No. 16/545,453, dated Dec. 4, 2020, 7 pages.

European Patent Office, "Communication Pursuant to Article 94(3) EPC," mailed in connection with European Patent Application No. 16812108.5, dated Oct. 29, 2020, 6 pages.

European Patent Office, "Extended European Search Report," mailed in connection with European Patent Application No. 20200719.1, dated Jan. 15, 2021, 12 pages.

Japanese Patent Office, "Decision to Refuse," mailed in connection with Japanese Patent Application No. 2017-559835, dated Mar. 9, 2021, 9 pages.

National Intellectual Property Administration of China, "Office Action," mailed in connection with Chinese Patent Application No. 201680028425.0, dated May 26, 2021, 6 pages.

* cited by examiner

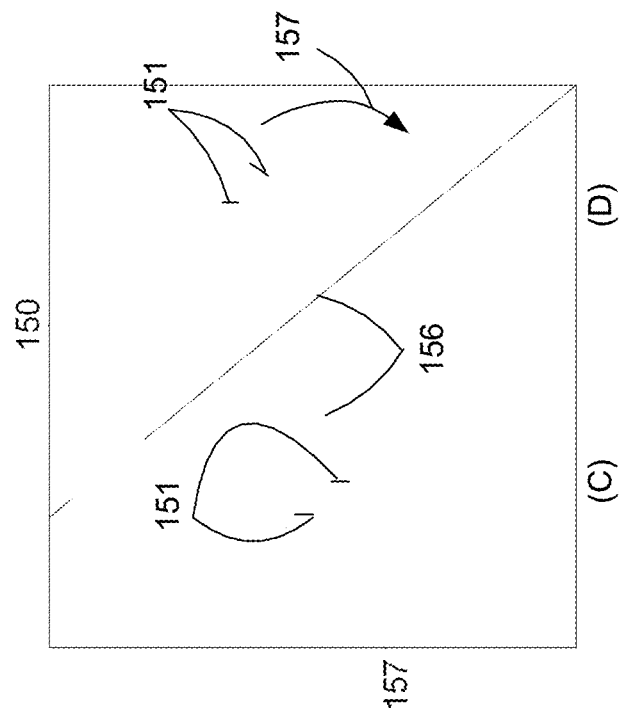
FIGs. 1C-D
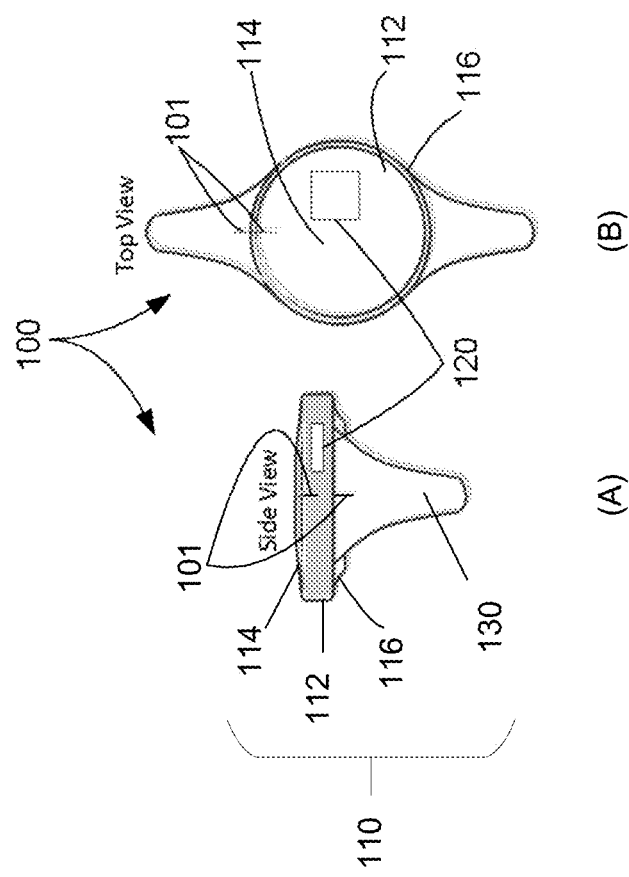
FIGs. 1A-B

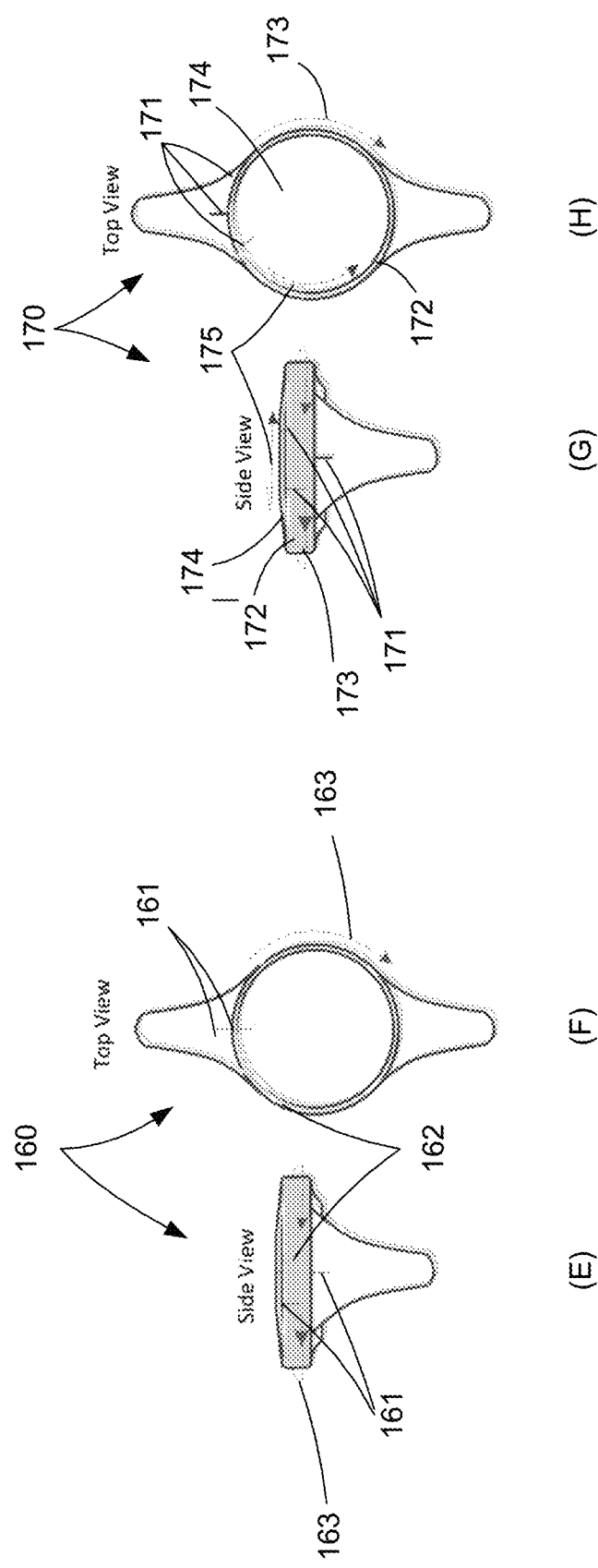
FIGs. 1G-H
FIGs. 1E-F

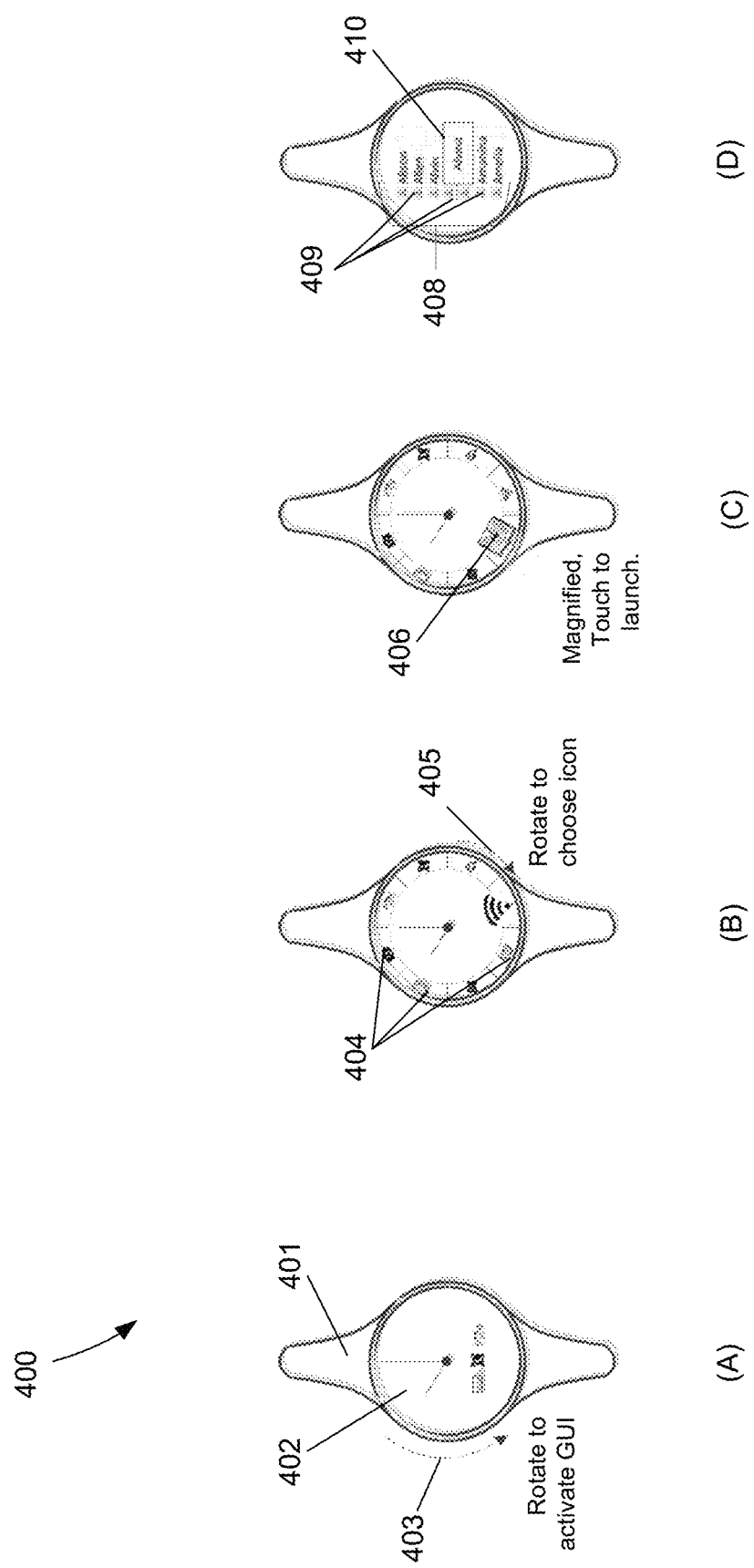
FIGs. 4A-D

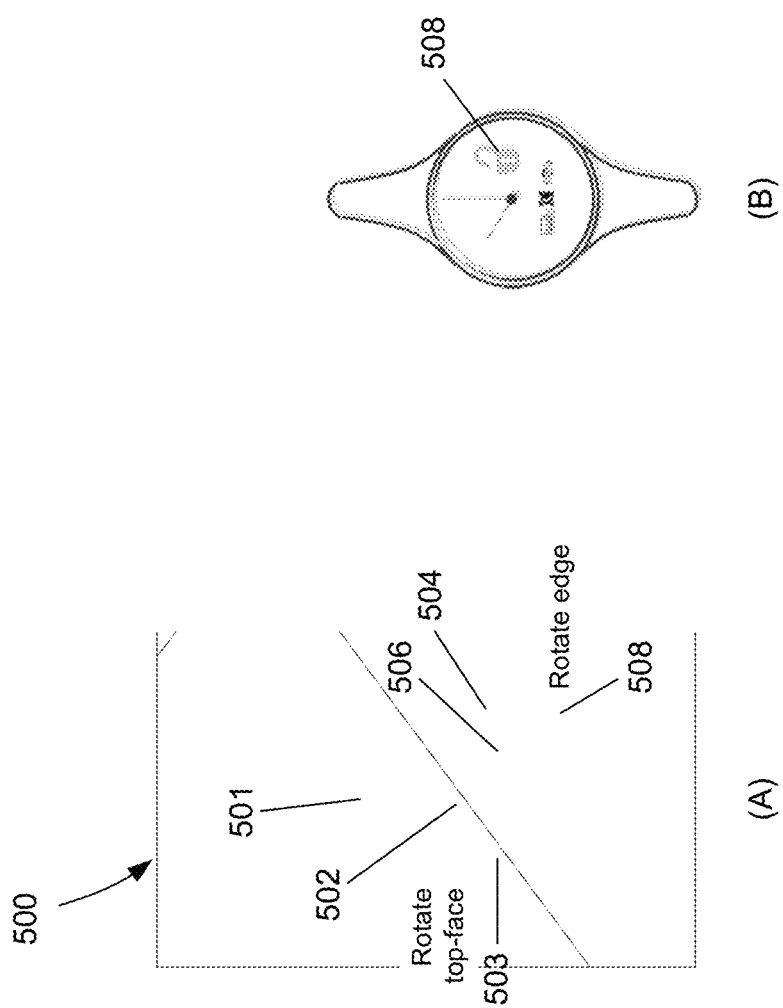
FIG. 5A-B

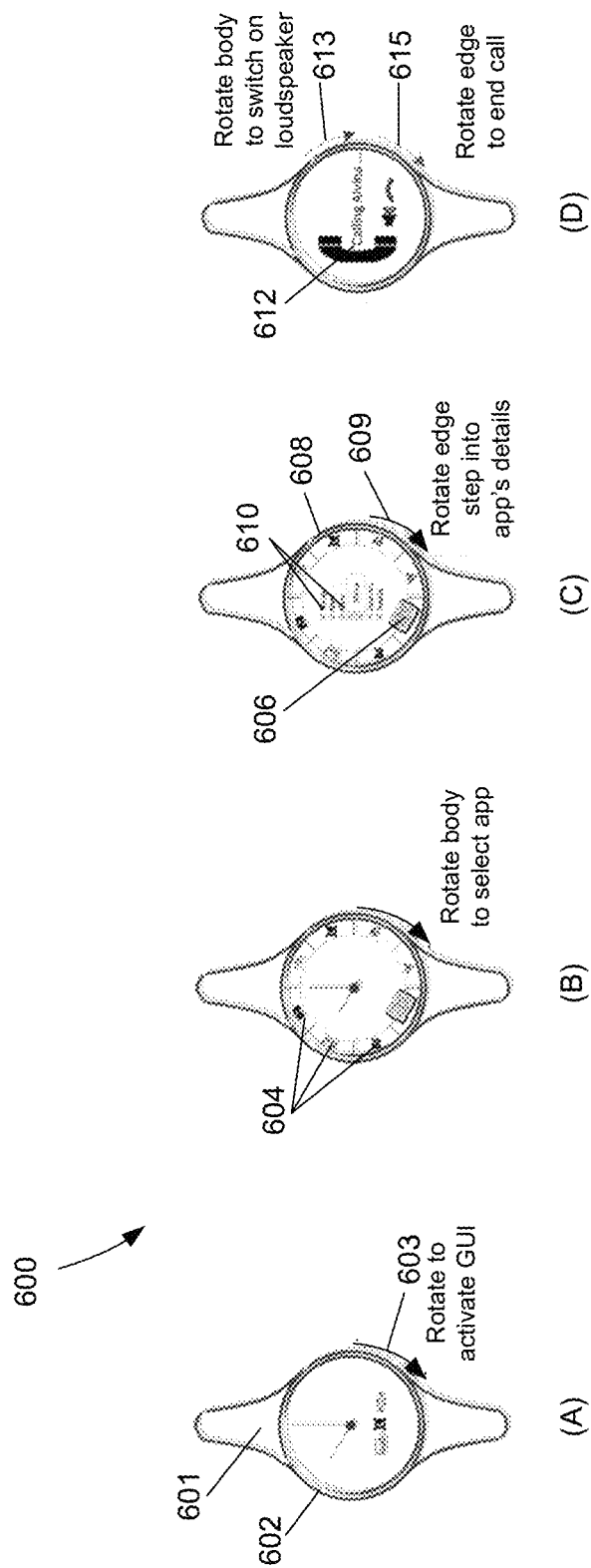
FIGs. 6A-D

GYRATORY SENSING SYSTEM TO ENHANCE WEARABLE DEVICE USER EXPERIENCE VIA HMI EXTENSION

CROSS-REFERENCE TO RELATED APPLICATIONS

This patent arises from a continuation of U.S. patent application Ser. No. 16/545,453, filed Aug. 20, 2019, entitled "GYRATORY SENSING SYSTEM TO ENHANCE WEARABLE DEVICE USER EXPERIENCE VIA HMI EXTENSION," which is a continuation of U.S. patent application Ser. No. 14/740,609, filed Jun. 16, 2015, entitled "GYRATORY SENSING SYSTEM TO ENHANCE WEARABLE DEVICE USER EXPERIENCE VIA HMI EXTENSION." The contents of these applications are hereby incorporated herein by reference.

BACKGROUND

Smart devices including smart phones, mobile phones, tablet computers, and the like have become pervasive. Further, wearable devices, such as smartwatches, fitness bands and monitors, action cameras, and the like, have become increasingly popular. These wearable devices may often include a very small touchscreen to interact with the device. Users of these devices may need to accurately touch the correct user interface (UI) or icons, which are often spaced closely together, and/or swipe the interface several times to search and launch an application. Further, some of these devices include no touchscreen or user interface at all. As a result, the user experience for these small wearable devices may be degraded due to their confined Human Machine Interface (HMI). Some of the existing hardware and software solutions to sense user input may include push buttons, voice controls and gesture controls. These solutions, however, may suffer several disadvantages including limited states (i.e., ON and OFF states for hardware push buttons), complex and expensive interfaces (i.e., gesture and voice sensing require complex and expensive computing power and sensors), and unfashionable appearance (e.g., protruding hardware is not integrated, stylish or compatible with wearable devices). Simply put, conventional small wearable devices, such as smartwatches, having confined touchscreens and/or user interfaces may not be optimally useful (i.e., inaccurate, less user-friendly, unintegrated, and incompatible) to the wearer.

BRIEF DESCRIPTION OF THE DRAWINGS

The various advantages of the embodiments will become apparent to one skilled in the art by reading the following specification and appended claims, and by referencing the following drawings, in which:

FIGS. 1A-B are illustrations of an example of a smartwatch having a gyroscopic sensing system according to an embodiment;

FIGS. 1C-D are illustrations of an example of a smartwatch having a gyroscopic sensing system with a rotating body according to an embodiment;

FIGS. 1E-F are illustrations of an example of a smartwatch having a gyroscopic sensing system with a rotating edge according to an embodiment;

FIGS. 1G-H are illustrations of an example of a smartwatch having a gyroscopic sensing system with a rotating face and edge according to an embodiment;

FIGS. 4A-D is an illustration of an example of a quick launch routine of a gyroscopic sensing system according to an embodiment;

FIGS. 5A-B is an illustration of an example of a lock/unlock routine of a gyroscopic sensing system according to an embodiment; and FIGS. 6A-D is an illustration of an example of a multi-dimension access routine of a gyroscopic sensing system according to an embodiment.

DETAILED DESCRIPTION

Figure 2:
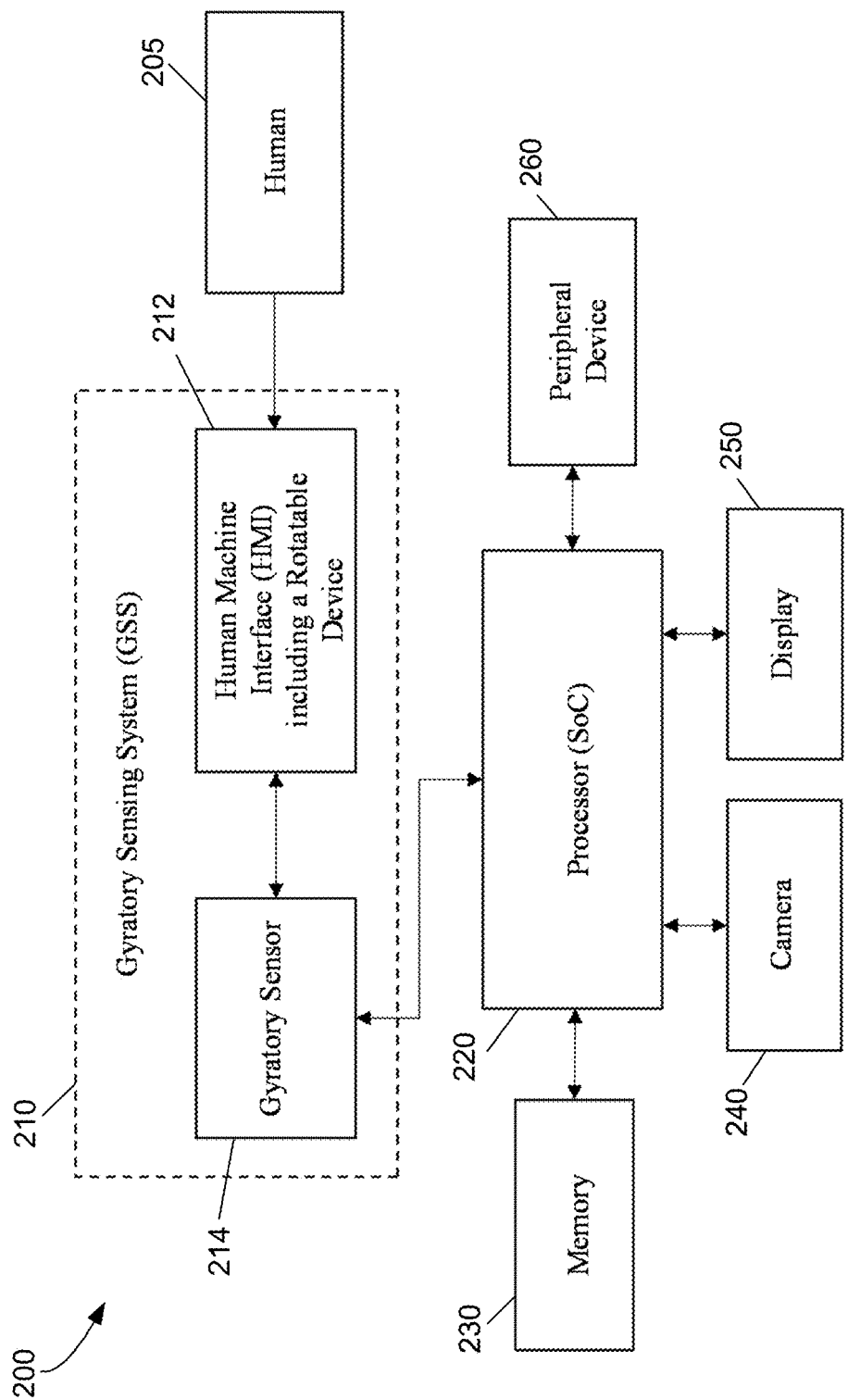
FIG. 2 is a block diagram of an example of a gyroscopic sensing system according to an embodiment.

FIGS. 1A-B show side and top views, respectively, of a wearable device 100 having a gyroscopic sensing system 110 in accordance with an embodiment of the disclosure. The wearable device 100 may be one or many devices including, for example, a smartwatch, a fitness band or monitor, an action camera, and the like, that have relatively small or no graphical user input (GUI), such as a touchscreen. The wearable device 100 may include a rotatable device 110 having one or more rotatable components, e.g., a rotatable edge component 112 (e.g., a watch bezel), a rotatable face component 114 (e.g., a watch crystal), and a rotatable body component 116 (e.g., a watch body or case), that may be in communication with and engage an embedded gyroscopic sensor 120. The wearable device 100 may also include a strap or bracelet 130 that may be used to attach the wearable device 100 to a user, e.g., to the wrist of a user. The rotatable device 110 and the associated rotatable components 112, 114, 116 are capable of rotating separately (i.e., independently) around at least one axis of rotation, e.g., x-axis, y-axis, or z-axis. The gyroscopic sensor 120 may embody a single axis, micro-electro-mechanical systems (MEMS) rate gyroscope chip that is capable of sensing rotation on one of three axes of movement, e.g., x-axis (pitch), y-axis (roll), and z-axis (yaw), depending on the mounting arrangement. The gyroscopic sensor 120 may embody a relatively small size and low cost arrangement suitable for sensing motion in small consumer electronic devices, e.g., the wearable device 100. An example of a suitable gyroscopic sensor chip for use with the disclosure is the single axis (z) MEMS gyroscope model ISZ-2510 available from InvenSense® Inc. of San Jose, Calif. The illustrated rotatable device 110 and the gyroscopic sensor 120 form at least a portion of a gyroscopic sensing system that may extend a Human Machine Interface (HMI), e.g., a touchscreen, of a small wearable device, e.g., the wearable device 100, to be more useful (i.e., more accurate, user-friendly, integrated and compatible).

In the illustrated example, the wearable device 100 includes illustrated corresponding landmark lines 101 that align to define a reset (i.e., rest or ready) position for the rotatable components 112, 114, 116. It is noted that while the landmark lines 101 are illustrated by straight lines, this is for illustration purposes only. Other arrangements may be used to define the alignment of rotatable components 112, 114, 116 including, for example, stops, bumps, and similar structures that bring the rotatable components into alignment at the reset position. The gyroscopic sensor 120 may be arranged to receive a user input via the rotation of one or more of the rotatable components 112, 114, 116 of the rotatable device 110, e.g., around the z-axis, to form an HMI that extends the utility of the user interface (i.e., touchscreen) to include more input states and allows the user interface to be faster, more accurate, and more reliable.

For example, a user may rotate one or more of the rotatable components 112, 114, 116 in order to provide an input, e.g., to browse, select and/or launch (i.e., activate), for an application associated with the wearable device 100. As will be discussed further below, the input may be based on various factors including, for example, the degree of rotation from the reset position, the direction of rotation, rotation to a corresponding function icon, a sequence of rotation(s), and the like. The rotary, more ergonomically friendly inputs enabled by the rotatable device 110 may thereby provide the wearable device 100 with greater utility by allowing increased functionality and accuracy of input compared to a small user input (e.g., a touchscreen) having confined and limited display space with an ever-increasing number of applications. Users may thereby provide more effective and reliable inputs.

Turning now to FIGS. 1C-D, side and top views, respectively, of a wearable device 150 are shown in accordance with an embodiment of the disclosure. The wearable device 150 is similar to the wearable device 100 (FIGS. 1A-B) and includes a gyroscopic sensing system having a rotatable body 156 capable of rotating around a z-axis (e.g., in the clockwise direction (see arrow 157)) from the reset position (i.e., such that the landmark lines 151 are not in alignment) in order to browse, navigate, and/or launch applications associated with the wearable device 150. FIGS. 1E-F show side and top views, respectively, of a wearable device 160 in accordance with an embodiment of the disclosure. The wearable device 160 is similar to the wearable device 100 (FIGS. 1A-B) and includes a rotatable edge 162 capable of rotating around a z-axis (e.g., in the clockwise direction (see arrow 163)) from the reset position (i.e., such that the landmark lines 161 are not in alignment) in order to browse, navigate, and/or launch applications associated with the wearable device 160. FIGS. 1G-H show side and top views of a wearable device 170 in accordance with an embodiment of the disclosure. The wearable device is similar to wearable device 100 (FIGS. 1A-B) and includes a rotatable edge 172 and a rotatable face 174 that are both capable of rotating around a z-axis (e.g., in the clockwise direction (see arrow 173) and in the counter-clockwise direction (see arrow 175), respectively) from the reset position (i.e., such that the landmark lines 171 are not in alignment) in order to browse, navigate, and/or launch applications associated with the wearable device 170.

Turning now to FIG. 2, an example of a gyroscopic sensing system 200 in accordance with an embodiment of the disclosure is shown. The system 200 may include a gyratory sensing system 210, a processor 220, and a memory device 230. The gyratory sensing system 210 may include a Human Machine Interface (HMI) 212 (having a rotatable device) and a gyratory sensor 214 (both discussed more thoroughly above with respect to FIGS. 1A-H). The HMI 212 may be configured and arranged to receive an input from a user 205, e.g., a human, and communicate the input to the gyratory sensor 214. The gyratory sensor 214 may be in communication with the processor 230 (e.g., a system on chip (SoC) processor) and the memory device 230, and may sense the user input in a manner that extends the HMI 212 to be more useful. The system 200 may also include various optional components including, for example, a camera 240, display 250, and other peripheral device(s) 260.

In use, the gyratory sensing system 210 may receive an input from a user 205 via a rotatable device of the HMI 212. The input(s) (corresponding to a user selection of system or application function, option, process, etc.) may be communicated, for example, by the user 205 rotating one or more of the rotatable components of the rotatable device. The rotatable device may embody a rotatable device as discussed above with respect to FIGS. 1A-D. The gyratory sensor 214 may be in communication with the HMI 212 to receive and sense the user input(s) based on, for example, the degree of rotation of the one or more rotating components from a reset position. The user input(s) may be communicated via a component of the system 200, e.g., the display 250. The user input(s) may also be used to adjust, alter, change, navigate, browse, and/or select, etc. the functions, options, processes, and the like of the camera 240, display 250, or other peripheral device(s) 260. The gyratory sensing system 200 may thereby provide the wearable device with greater utility by allowing improved input functionality, ergonomics, reliability and accuracy. As an example, due to the limited size and screen space that may be offered by small wearable devices (e.g., wearable device 150), the gyratory sensing system 210 may, for example, allow more functions and/or applications (which may be represented, for example, by icons) associated with the wearable device (e.g., wearable device 150) or an associated peripheral device to be more quickly, reliably and accurately browsed and selected when compared to other user interfaces. Further, in at least some embodiments, the ergonomics and tactile layout of the HMI 212 may improve the speed, reliability, and accuracy of user inputs when compared to other user interfaces.

In various embodiments, the gyratory sensing system 200 may allow the functionality of a wearable device (e.g., wearable device 150, 160 or 170) to be improved by extending a utility of the HMI 212. In some embodiments, "extending a utility of the human machine interface" may mean providing the wearable device with greater utility by enabling improved input functionality, ergonomics, reliability and accuracy consistent with the disclosure herein. In at least some embodiments, the improved input functionality may be accomplished via one or more rotatable components such as, for example, the rotatable components 112, 114, 116 (FIGS. 1A-B), that enable functions of one or more applications associated with the HMI 212 to be selected in a manner that quickly and accurately launches the applications (as discussed more thoroughly below with respect to FIGS. 4A-D). For example, the rotatable components may allow a user to quickly and accurately zoom in and out of one or more functions associated with the HMI such that the functionality, ergonomics, reliability or accuracy of the user input may be improved. In at least some embodiments, the improved input functionality may be accomplished via one or more rotatable components such as, for example, the rotatable components 112, 114, 116 (FIGS. 1A-B) that allow a wearable device and/or one or more applications associated with the wearable device to be quickly and accurately locked and/or unlocked (as discussed more thoroughly below with respect to FIGS. 5A-D). In at least some embodiments, the improved input functionality may be accomplished via one or more rotatable components such as, for example, the rotatable components 112, 114, 116 (FIGS. 1A-B), that allow the one or more applications associated with the HMI 212 to be quickly and accurately accessed in a manner that enables multi-dimensional access to the applications (as discussed more thoroughly below with respect to FIGS. 6A-D). In some embodiments, the various improvements disclosed herein may be combined in various different arrangements not explicitly disclosed herein without departing from the disclosure.

Figure 3:
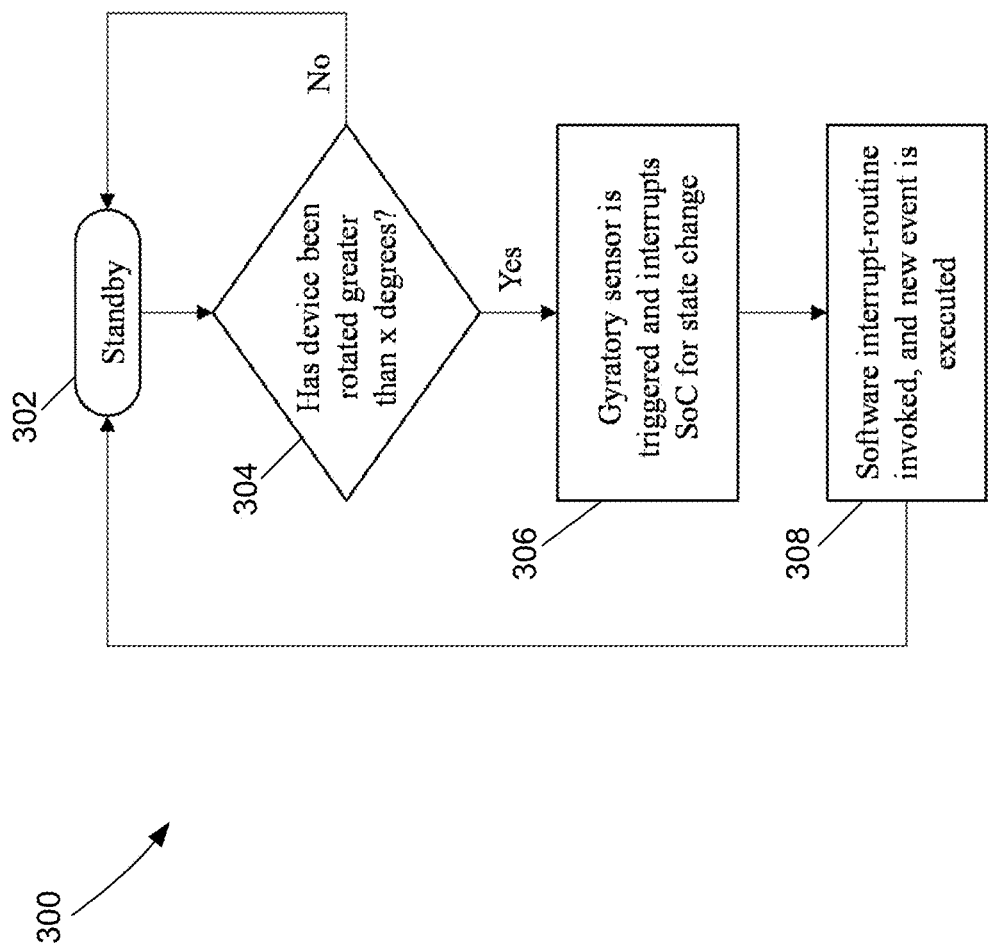
FIG. 3 is a flowchart of an example of a gyroscopic sensing process according to an embodiment.

FIG. 3 shows an example of a gyroscopic sensing process in accordance with an embodiment of the disclosure. The process 300 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 302 provides for remaining in a "Standby" (i.e., reset, rest, or ready) state. At block 304 a determination may be made as to whether one or more rotatable component(s) of the rotatable device has been rotated greater than a predetermined number of degrees (e.g., x degrees or x°). If "No", the process 300 returns to block 302 and remains in a "Standby" state. If "Yes", the process 300 proceeds to block 306 in which the gyratory sensor is triggered and interrupts a processor (i.e., an SoC) for a state change (e.g., update of the user interface (touchscreen or GUI) based on the input). At block 308, a software interrupt-routine is invoked, and the new event is executed. Once complete, the illustrated process 300 returns to block 302. An example of suitable pseudo-code for executing the process 300 is provided, as follows:

Pseudo-Code
1) Standby
2) Detects rotation
   (clockwise=positive, counter-clockwise=negative)
3) Rotation detected above threshold, vibrates the wearable device
4) If rotation value=+x
5) Set action_1=action_1+x
6) Else, if rotation value=−y
7) Set action_1=action_1−y
8) Update GUI's menu FIGS. 4A-D show an illustration of an example of a quick launch routine 400 for a wearable device in accordance with an embodiment of the disclosure. The quick launch routine 400 of a wearable device 401, consistent with the disclosure herein, may define a pre-determined list and operation of quick launch icons 404 to launch an application. The quick launch routine 400 may begin at (A) by engaging (i.e., rotating) a rotating component 402, e.g., a watch face, in a direction (e.g., counter-clockwise (see arrow 403)) around a z-axis. Rotating the rotating component 402 (e.g., beyond a predetermined degree or to a predetermined location) awakes the system by triggering a gyratory sensor (not shown) and interrupts the processor (e.g., SoC) for a state change. Once awake, the system may show a list of shortcut icons to quick launch an application. At (B) the system presents various application quick launch (i.e., shortcut) icons 404 for browsing and selection by the user in order to quick launch an application. The total number of items or applications to be listed may be customized by the user (e.g., by software). User selection may be made by rotating the rotating component 402, for example, in an opposite direction (e.g., clockwise direction (see arrow 405)). At (C) the illustrated system magnifies the selected application quick launch icon 406 (i.e., a phonebook) for easier and more reliable activation (i.e., launch) by, for example, being touched by a user and/or after a pre-determined period of time (e.g., after 2 seconds). At (D) the various individual entries 409 of the selected application 408 (i.e., phonebook) may be browsed via the rotatable component 402, and the selected individual entry 410 may be magnified and launched by the passage of time or by touch. The illustrated quick launch routine 400 may thereby provide a quick, accurate and reliable means for extending the utility of an HMI.

FIGS. 5A-B show an illustration of an example of a lock/unlock routine 500 of a gyroscopic sensing system in accordance with an embodiment of the disclosure. The lock/unlock routine 500 (i.e., unlock routine) of a wearable device 501, consistent with the disclosure herein, may define a pre-determined sequence of rotating one or more of rotatable components 502, 504 of the wearable device 501. The unlock routine 500 may begin at (A) by engaging (i.e., rotating) a first rotating component 502 (e.g., a watch face) in a first direction (e.g., a counter-clockwise direction (see arrow 503)) a pre-determined distance or degree (e.g., 30 degrees or 30°) around a z-axis, and then rotating a second rotating component 504 (e.g., a watch edge) in a second direction (e.g., a clockwise direction (see arrow 505)) a predetermined distance or degree (e.g., 60 degrees or 60°) around the z-axis. Upon completion of the lock/unlock routine 500 the wearable device may quickly and reliably be transformed from a locked state 506 to an unlocked state 508. It is noted that the wearable device 501 may similarly be locked by performing a comparable operation, i.e., lock routine. The lock/unlock routine 500 may thereby provide another quick, accurate and reliable means for extending the utility of an HMI.

FIGS. 6A-D show an illustration of an example of a multi-dimension access routine 600 of a gyroscopic sensing system according to an embodiment of the disclosure. The multi-dimension access routine 600 of a wearable device 601, consistent with the disclosure herein, may define a pre-determined operation of a multi-dimension application interface. The multi-dimension access routine 600 may begin at by engaging (i.e., rotating) a first rotating component 602 (e.g., a watch body) in a first direction (e.g., a clockwise direction (see arrow 603)) a pre-determined distance or degree around the z-axis in order to activate (i.e., awake) the user interface (i.e., touchscreen or GUI). At (B) various application icons 604 may be presented on the user interface for selection by a user. The first rotating component 602 may be further rotated in a clockwise direction, for example, in order to navigate the various application icons 604. At (C) the selected application icon 606 (e.g., a phonebook) may be magnified and a second rotatable component 608 (e.g., a watch edge) may be rotated, for example, in a clockwise direction in order to launch or "step into" the details 610 of the selected application 606 (i.e., search the contacts of the phonebook). At (D) the selected detail 612 (i.e., contact) may be magnified for easier launch via touch by the user or passage of a pre-determine period of time (e.g., 2 seconds). Other features may also be launched via the rotatable components 602, 608. For example, once the call has been launched a loudspeaker may be activated, for example, by rotating the first rotatable component 608 (i.e., the watch body) in a clockwise direction (see arrow 613). The call may be ended, for example, by rotating the second rotating component (i.e., the watch edge) in a clockwise direction (see arrow 615). The multi-dimension access routine 600 may thereby provide another quick, accurate and reliable means for extending the utility of an HMI.

An example of suitable pseudo-code for executing the routines disclosed herein is provided, as follows:

Pseudo Code
1) Standby
2) Detects rotation
   1) (clockwise=positive, counter-clockwise=negative)
3) Rotation detected above threshold, vibrates the wearable device
4) If rotation is from face's rotation, then
   1) If rotation value=+x
   2) Set action_1=action_1+x
   3) Else if rotation value=−y
   4) Set action_1=action_1−y
   5) Update GUI's menu
5) Else, if rotation is from edge's rotation, then
   1) If rotation value=+x
   2) Set action_2=action_2+x
   3) Else if rotation value=−y
   4) Set action_2=action_2−y
   5) Update GUI's menu
6) Else, if rotation is from body's rotation, then
   1) If rotation value=+x
   2) Set action_3=action_3+x
   3) Else if rotation value=−y
   4) Set action_3=action_3−y
   5) Update GUI's menu

ADDITIONAL NOTES AND EXAMPLES

Example 1 may include a gyratory sensing system having a memory device, a processor in communication with the memory device, and a gyratory sensing system in communication with the processor. The gyratory sensing system may include a human machine interface to receive a user input, and a gyratory sensor to sense the user input in a manner that extends a utility of the human machine interface.

Example 2 may include the system of Example 1, wherein the human machine interface includes a rotatable device having one or more rotatable components to navigate and engage one or more functions associated with the human machine interface.

Example 3 may include the system of Example 2, wherein the one or more rotatable components are capable of rotating independently.

Example 4 may include the system of Example 2 or Example 3, wherein the one or more rotatable components include a body component, an edge component and a face component.

Example 5 may include the system of Example 1, wherein the gyratory sensor is a single axis sensor to sense rotation on one of three axes of movement.

Example 6 may include the system of Example 5, wherein the gyratory sensor is a micro-electro-mechanical systems (MEMS) rate gyroscope.

Example 7 may include the system of Example 1, wherein the processor is a system on chip (SoC) processor.

Example 8 may include a wearable gyratory sensing apparatus having a memory device in communication with a processor, and a gyratory sensing system to communicate with the processor. The gyratory sensing system may include a human machine interface to receive a user input, wherein the human machine interface forms at least a part of a wearable device, and a gyratory sensor to sense the user input in a manner that extends a utility of the human machine interface to make one or more functions of the wearable device more accessible.

Example 9 may include the apparatus of Example 8, wherein the human machine interface includes a rotatable device having one or more rotatable components to navigate and engage the one or more functions.

Example 10 may include the apparatus of Example 9, wherein the one or more functions are to be identified via one or more icons.

Example 11 may include the apparatus of Example 9 or Example 10, wherein the one or more icons are to select or adjust one or more functions associated with the wearable device.

Example 12 may include the apparatus of Example 10, wherein the one or more icons are to select or adjust one or more functions associated with a device other than the wearable device.

Example 13 may include the apparatus of Example 10, wherein the rotatable components are to zoom in and out of the one or more functions in order to improve one or more of the functionality, ergonomics, reliability or accuracy of the user input.

Example 14 may include the apparatus of Example 8, wherein the gyratory sensor senses a distance or degree of rotation of the human machine interface to detect a change in the state of the gyratory sensing system.

Example 15 may include a gyratory sensing method including receiving, via a human machine interface, a user input; and sensing, via a gyratory sensor, the user input in a manner that extends a utility of the human machine interface. Receiving the user input may be performed via a human machine interface, and sensing the user input may be performed via gyratory sensor.

Example 16 may include the method of Example 15, further including engaging, via one or more rotatable components of a rotatable device of the human machine interface, one or more functions associated with the human machine interface.

Example 17 may include the method of Example 16, wherein the one or more rotatable components are capable of rotating independently.

Example 18 may include the method of Example 16 or Example 17, wherein the one or more rotatable components include a body component, an edge component and a face component.

Example 19 may include the method of Example 15, wherein the gyratory sensor is a single axis sensor to sense rotation on one of three axes of movement.

Example 20 may include the method of Example 19, wherein the gyratory sensor is a micro-electro-mechanical systems (MEMS) rate gyroscope.

Example 21 may include at least one computer readable storage medium having a set of instructions which, when executed by a computing device, cause the computing device to receive, via a human machine interface, a user input; and sense, via a gyratory sensor, the user input in a manner that extends a utility of the human machine interface. The user input may be received via a human machine interface. The user input may be sensed via gyratory sensor.

Example 22 may include the at least one computer readable storage medium of Example 21, wherein the instructions, when executed, cause a computing device to engage, via one or more rotatable components of a rotatable device of the human machine interface, one or more functions associated with the human machine interface.

Example 23 may include the at least one computer readable storage medium of Example 22, wherein the one or more rotatable components are capable of rotating independently.

Example 24 may include the at least one computer readable storage medium of Example 22 or Example 23, wherein the one or more rotatable components include a body component, an edge component and a face component.

Example 25 may include the at least one computer readable storage medium of Example 21, wherein the gyratory sensor is a single axis sensor to sense rotation on one of three axes of movement.

Example 26 may include a gyratory sensing apparatus having means for receiving a user input, and means for sensing the user input in a manner that extends a utility of the human machine interface.

Example 27 may include the apparatus of Example 26, further including means for engaging one or more functions associated with the human machine interface.

Example 28 may include the apparatus of Example 27, wherein the means for engaging one or more functions associated with the human machine interface are capable of operating independently.

Example 29 may include the apparatus of Example 27 or Example 28, wherein the means for engaging one or more functions associated with the human machine interface may include a body component, an edge component and a face component.

Example 30 may include the apparatus of Example 26, wherein the means for sensing may include a single axis sensor to sense rotation on one of three axes of movement.

Example 31 may include the apparatus of Example 30, wherein the means for sensing may include a micro-electromechanical systems (MEMS) rate gyroscope.

As would be appreciated by a person of ordinary skill in the art, the specific arrangements disclosed herein may be arranged and/or rearranged in various combinations to include one or more rotatable component(s) which may or may not have been discussed specifically herein without departing from the disclosure. For example, particular embodiments may include arrangements that have a rotatable body, a rotatable edge, and a rotatable face. Further, the direction of rotation of the rotatable components is not intended to be limiting and may be reversed and/or rearranged without departing from the disclosure. Further still, various embodiments may utilize a rotation to a specific angle which may be further facilitated by the use of various stops, bumps, vibrations, haptic, sound, mechanical notches, and other arrangements that provide feedback in order to indicate the specific angle. Such embodiments may be particularly useful for user having impaired vision and/or impaired sensitivity to touch. In addition, while embodiments disclosed herein have been shown with respect to wearable device having a substantially round shape, other shapes may be used. For example, a rectangular smartwatch design may be used. In such use, once a rotatable component, e.g., a watch body or edge has been rotated during text input, for example, the keyboard orientation may be switched to a landscape orientation in order to take advantage of (i.e., match) the device design and improve the user experience.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

The invention claimed is:

1. An apparatus, comprising:
   means for securing a wearable electronic device to a user;
   means for rendering images on the wearable electronic device, the rendering means having a perimeter;
   means for rotatable selection to retrieve control input, the rotatable selection means to rotate relative to the rendering means; and
   means for processing to:
      render a first one of the images on the rendering means;
      render a second one of the images on the rendering means in response to rotation of the rotatable selection means; and
      cause the first one of the images or the second one of the images to be magnified in response to detecting the rotatable selection means rotating relative to the rendering means.

2. The system as defined in claim 1, further including means for sensing to detect a threshold degree of rotation of the rotatable selection means.

3. The system as defined in claim 2, wherein the processing means is to execute an event in response to the threshold degree of rotation of the rotatable selection means.

4. The system as defined in claim 1, wherein the processing means is to execute a first event in response to detecting a first rotation direction of the rotatable selection means, and to execute a second event in response to detecting a second rotation direction of the rotatable selection means.

5. The system as defined in claim 4, wherein the first rotation direction includes at least one of a clockwise direction or a counterclockwise direction, and the second rotation direction includes an other one of the at least one of the clockwise direction or the counterclockwise direction.

6. The system as defined in claim 1, wherein the processing means is to render the first one of the images as a first selectable icon, and render the second one of the images as a second selectable icon.

7. The system as defined in claim 6, further including means for touch detection, the processing means to cause the first selectable icon to execute a first event in response to the touch detection means detecting a touch of the first selectable icon.

8. A machine-readable storage medium comprising instructions that, when executed, cause at least one processor to at least:
   render first content on a display of a wearable electronic device, the display having a perimeter;
   detect a rotation action of a bezel surrounding the perimeter of the display;
   render second content on the display in response to the rotation action of the bezel; and
   cause the first content or the second content to be magnified in response to detecting the bezel rotating.

9. The machine-readable storage medium as defined in claim 8, wherein the instructions, when executed, cause the at least one processor to detect a threshold degree of rotation of the bezel.

10. The machine-readable storage medium as defined in claim 9, wherein the instructions, when executed, cause the at least one processor to execute an event in response to the threshold degree of rotation of the bezel.

11. The machine-readable storage medium as defined in claim 8, wherein the instructions, when executed, cause the at least one processor to execute a first event in response to detecting a first rotation direction of the bezel, and to execute a second event in response to detecting a second rotation direction of the bezel.

12. The machine-readable storage medium as defined in claim 11, wherein the instructions, when executed, cause the at least one processor to detect at least one of a clockwise direction or a counterclockwise direction of the first rotation direction, and to detect an other one of the clockwise direction or the counterclockwise direction of the second rotation direction.

13. The machine-readable storage medium as defined in claim 8, wherein the instructions, when executed, cause the at least one processor to render the first content as a first selectable icon, and render the second content as a second selectable icon.

14. The machine-readable storage medium as defined in claim 8, wherein the instructions, when executed, cause the at least one processor to detect a touch of a touchscreen.

15. The machine-readable storage medium as defined in claim 14, wherein the instructions, when executed, cause the at least one processor to:
  cause a first selectable icon to execute a first event in response to detecting the touch of the touchscreen, the touch corresponding to the first selectable icon on the touchscreen; and
  cause a second selectable icon to execute a second event in response to detecting the touch of the touchscreen, the touch corresponding to the second selectable icon on the touchscreen.

16. A wearable electronic device, comprising:
  a band connected to the wearable electronic device;
  a display having a perimeter;
  a bezel surrounding the display, the bezel rotatable relative to the display; and
  processor circuitry to:
    render first content on the display;
    render second content on the display in response to the bezel rotating relative to the display; and
    cause the first content or the second content to be magnified in response to detecting the bezel rotating relative to the display.

17. The wearable electronic device as defined in claim 16, further including a gyroscope sensor to detect a threshold degree of rotation of the bezel.

18. The wearable electronic device as defined in claim 17, wherein the processor circuitry is to execute at least one event in response to the threshold degree of rotation of the bezel.

19. The wearable electronic device as defined in claim 18, wherein the processor circuitry is to execute a first one of the at least one event in response to detecting a first rotation direction of the bezel, and to execute a second one of the at least one event in response to detecting a second rotation direction of the bezel.

20. The wearable electronic device as defined in claim 19, wherein the first rotation direction includes at least one of a clockwise direction or a counterclockwise direction, and the second rotation direction includes an other one of the at least one of the clockwise direction or the counterclockwise direction.

21. The wearable electronic device as defined in claim 16, wherein the processor circuitry is to render the first content as a first selectable icon, and render the second content as a second selectable icon.

22. The wearable electronic device as defined in claim 21, further including a touchscreen, the processor circuitry to cause the first selectable icon to execute an event in response to the touchscreen detecting a touch of the first selectable icon.

\* \* \* \* \*